Patented Feb. 27, 1951

2,543,440

UNITED STATES PATENT OFFICE

2,543,440

PROCESS FOR TREATING POLYMERS PRODUCED BY ALKALI METAL CATALYZED POLYMERIZATIONS

Willie W. Crouch, Bartlesville, Okla., assignor to Phillips Petroleum Company, a corporation of Delaware No Drawing. Application April 11, 1949, Serial No. 86,862

14 Claims. (Cl. 260—666)

This invention relates to an improved method for treating polymers produced by alkali metal catalyzed polymerization. In one embodiment it relates to a method for the recovery of liquid polymers from the alkali metal catalyzed polymerization of conjugated diolefins wherein the product is substantially free from the catalyst. In one specific embodiment this invention relates to treating liquid polymers produced by solution polymerization of 1,3-butadiene in the presence of metallic sodium as a catalyst wherein the resulting treated product is substantially free of sodium.

The polymerization of conjugated diolefins, such as 1,3-butadiene, in the presence of alkali metals, such as sodium or potassium or lithium, in the presence or absence of a solvent, is well known. Solid or liquid polymers may be produced using these catalysts; liquid polymers are readily formed by operating at relatively high temperatures with a suitable solvent, such as benzene, heptane or the like to obtain a solution of a liquid polymer in the solvent.

In the alkali metal polymerization of conjugated diolefins and the like it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. One of the most common methods employed in the art for the removal of alkali metal catalysts has been the use of water to convert these catalysts to alkali metal hydroxides. However, it is difficult to remove the last traces of these alkali metal hydroxides from a polymer, a fact that is well known to those skilled in the art. Alkali metal hydroxides left in the polymers are deleterious for many uses of such polymers. For instance, a low molecular weight polymer, which is to be incorporated in low plasticity Buna-S type synthetic rubber for improving its processing characteristics, will impart too fast a curing rate of a compound of said rubber if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes and protective surface coatings, and adhesive formulations.

What is desired is a method of removing the alkali metal catalysts from a liquid polymer of a conjugated diene to such an extent that, on analytically burning a sample of the polymer, substantially no ash is found. While treatment and extraction with water or an alcohol have been practiced in the art with fair success, these methods are not satisfactory for producing the substantially ash-free products necessary for many applications.

I have now discovered a new and efficient method of removing alkali metals and their residues from liquid polymers produced by solution polymerization of conjugated dienes in the presence of alkali metal catalysts. According to my process the reaction product from such a polymerization is contacted, by any suitable means, such as countercurrent contacting, mechanical mixing or the like, with a solution or mixture of water and a low molecular weight alcohol to which has been added a minor portion of an acid, preferably a mineral acid, such as sulfuric, hydrochloric, hydrobromic, nitric, and phosphoric acids. In some cases an organic acid containing not more than 4 carbon atoms per molecule may be used in the practice of my invention. The low molecular weight alcohol distributes itself between the oil and water phases in proportions depending largely on the specific alcohol employed. By gently stirring a hydrocarbon solution with the composition of my invention, I am able to effect reaction of the alkali metal and alkali metal-organic compounds and efficiently extract the resulting alkali metal salts from the oil phase into the water phase. Phase separation is complete so that substantially no alkali metal compounds are left in the polymer phase. When operating according to my process a polymer is obtained which contains, preferably, not more than 0.1 per cent by weight of ash.

When treating a polymer solution with the composition of my invention, the acid and alkali metal react to form the corresponding alkali metal salt which enters the water phase and becomes part of the treating composition. This treating composition may be used repeatedly without removing the salt; in fact, the presence of a minor proportion of said salt has been found to enhance the efficiency of my treatment. Therefore, in one embodiment of my invention an alkali metal salt may be added initially to the treating composition, if desired. It is usually preferable to add a salt corresponding to the salt formed by the reaction of the alkali metal catalyst and the acid in the treating solution; however, it is to be understood that any alkali metal salt may be used in the treating solution.

An object of this invention is to provide an improved method for treating polymers produced by polymerization of conjugated diolefins in the presence of an alkali metal catalyst.

Another object of this invention is to treat a liquid polymer prepared by polymerization of conjugated diolefins in the presence of an alkali metal catalyst whereby the resulting treated polymer contains substantially no non-combustible material.

Another object of this invention is to treat a liquid co-polymer prepared by co-polymerization of conjugated diolefins and aromatic compounds containing a vinyl group in the presence of an alkali metal catalyst whereby the resulting treated co-polymer contains substantially no non-combustible material.

Still another object of this invention is to remove in a novel and efficient manner sodium and sodium-organic compounds from liquid polybutadiene containing the same.

Still other objects and advantages of this invention will be obvious to one skilled in the art from the accompanying disclosure and discussion.

As a specific embodiment of a preferred method of applying my invention, 80 parts by volume of a dark n-heptane solution of a liquid polymer from a sodium-catalyzed polymerization of butadiene was stirred with 20 parts of isopropanol for a short time. Then 20 parts of a water solution containing five weight per cent each of sulfuric acid and sodium sulfate was added and the entire mixture was gently stirred for two hours. At the end of this period, the oil layer was clear and light in color. It was separated from the lower aqueous layer and the solvent stripped from the polymer. A sample of the resulting clear liquid polybutadiene was analyzed for ash content and no detectable amount of non-combustible material was found to be present.

My process is preferably carried out at a temperature of about 40 to 180° F. and at atmospheric pressure but, if desirable, it may be conducted at a higher or lower temperature and pressure.

It is known in the art to treat alkali metal-catalyzed polymers with alcohol or with water or with dilute acid solutions to destroy the alkali metal catalyst and effect some degree of removal of the said catalyst from the polymers. Water or dilute acid solutions will generally lighten the color and will often produce a clear polymer solution. However, neither water or dilute acids alone will produce a polymer which is substantially ash-free. What is not generally understood is that a large proportion of the alkali metal from such a polymerization is present in the form of addition compounds with the polymerized monomers. The alkali metal held in this form reacts with water or dilute acid solutions only with great difficulty. When attempting to use a low molecular weight alcohol to destroy and remove the alkali metal from a hydrocarbon solution of liquid diene polymers, a stable emulsion is formed so that only very incomplete removal is possible. It was therefore surprising to discover that a composition comprising water, acid and a low molecular weight alcohol should so effectively destroy and remove alkali metals and alkali metal-organic compounds from the said polymers. A possible explanation of the success of my invention is the use of the alcohol which acts as a solubilizing agent between the oil and water phases, thereby allowing more intimate contact between the dilute acid and the alkali metal-organic compounds.

The low molecular weight alcohol may be added in my process in a number of ways. It may all be added to the dilute acid solution, and this treating composition then stirred with the polymer solution, or it may all be added to the polymer solution before contacting with the acid solution. The other alternative, preferred for commercial practice, is to introduce part of the alcohol to the polymer solution and part to the acid solution before contacting the two. In any case, the alcohol will distribute itself between the oil and water phases during the treatment.

An advantage of the present invention is that there is substantially no loss of any of the components except the acid. The portion of the alcohol which remains in the treated polymer solution is recovered by distillation. More acid may be added to the treating composition as needed. As the concentration of the alkali metal salt builds up in the treating composition, part of the salt may be removed by suitable means such as cooling to form salt crystals and filtering. The alcohol which remains in the polymer solution may be replaced by alcohol recovered from polymer solutions previously treated. Thus, the treating composition may be used repeatedly to treat successive batches of polymers or it may be employed to treat polymer solutions in a continuous manner by removing part of the salt and adding more of the acid and alcohol as necessary. This last method is a preferred operating procedure for commercial practice since the composition of the treating solution may be held at substantially constant optimum values of the various components.

The several variables in my process, such as the concentrations of the acid and the alkali metal salt, the ratio of alcohol to water, etc., are all interdependent. Obviously, the specific limits which must be set upon the amounts and concentrations of the various components in my treating composition are dependent upon the particular materials employed: the specific alcohol, the specific acid and the specific solvent in which the polymer to be treated is dissolved. Further, the limits set upon the amount of one material depend upon the amounts of all the other materials involved. However, it is usually satisfactory to treat 100 parts by volume of the polymer solution with from 10 to 500 parts by volume of treating solution. This treating solution comprises from about 30 to 90 per cent by volume of water, from about 70 to 10 per cent by volume of a low molecular weight alcohol, from zero to about 15 weight per cent of an alkali metal salt, and enough acid to maintain the pH of the treating solution in the range of about 6.5 to 0.1 or below, but preferably in the range of about 6.5 to 3. It is usually desirable to allow the mixture of polymer and treating solution to stand after treating to permit complete separation of the two phases. The exact time will depend upon the specific conditions and the specific treating solution used. However, it is usually satisfactory to allow the mixture to stand after treating for a period of from 1 to 15 hours. It is to be understood that any other suitable means for separating the two phases may be used, for example, by centrifuging.

The low molecular weight alcohols which may be employed in my process comprise those which contain preferably not more than 4 carbon atoms per molecule, for example, methanol, ethanol, 1-propanol, 2-propanol, 1-butanol, 2-butanol, 2-methyl-1-propanol, 2-methyl-2-propanol, propylene glycol and butylene glycol. It is to be understood that mixtures of these low molecular weight alcohols may be employed if desired.

My invention applies to polymers made by the solution polymerization of conjugated dienes such as 1,3-butadiene, isoprene or 2,3-dimethyl-1,3-butadiene either alone or in admixture with each other and/or with minor proportions of other monomers copolymerizable therewith, such as styrene, methylstyrene, vinyl-naphthalene and the like.

In specifying that the polymers to which my invention applies are made in the presence of alkali metal catalysts, I have meant not only the alkali metals, such as sodium, potassium or lithium, but also organoalkali metal compounds, such as sodium butyl, sodium triphenyl methyl and the like, and alkali metal hydrides. These materials are examples of catalysts within the group consisting of the alkali metals, the alkali metal hydrides, the alkali metal alkyls, and the alkali metal aryls.

The polymer treated by the process of my invention may be dissolved in any suitable solvent, such as pentane, hexane, heptane, cyclohexane, benzene, toluene, xylene, or the like.

The following examples will more fully illustrate my invention, but the invention is not restricted to the conditions contained therein.

EXAMPLE I

A mixture of 3.5 pounds n-heptane and 0.015 pound sodium dispersed in xylene was charged to a stainless steel, jacketed autoclave equipped with a stirrer. The mixture was heated to a temperature of 185° F., the stirrer was started, and 0.5 pound of 1,3-butadiene was introduced until the pressure reached about 30 pounds per square inch gauge. After polymerization started additional butadiene was added over a period of two hours at a constant rate. The temperature was held at 185 to 195° F. throughout the polymerization. The total quantity of butadiene charged was 1.5 pounds. After the reaction was substantially complete, the polymer solution was withdrawn from the reactor and most of the metallic sodium was removed by settling and decanting the polymer solution.

To 100 parts by volume of the reaction mixture from the above polymerization was added 25 parts isopropanol, and this mixture was stirred for about five minutes. Then 25 parts of water solution containing eight weight per cent sulfuric acid and five weight per cent sodium sulfate was added and the entire mixture was gently stirred for two hours at 75° F. and atmospheric pressure. At the end of this period the oil layer was clear and light in color. It was separated from the lower aqueous layer, and a 10 cubic centimeter sample was analyzed for ash and was found to contain no detectable amount of non-combustible material.

A 10 cubic centimeter sample of a portion of the reaction mixture which had not been treated was analyzed for ash content. It was found to contain 1.09 weight per cent ash, based on the polymer.

EXAMPLE II

A polymerization was carried out as described in Example I. The reaction product was divided into four portions which were treated in the same manner as described in Example I except that the amount of isopropanol was varied as shown in the Table 1. Twenty-five volumes of water solution per 100 volumes of reaction mixture were employed as before.

Table 1

| Isopropanol, Per Cent by Volume of Oil Phase | Ash, weight per cent (based on polymer) |
|---|---|
| 0 | 0.98 |
| 6.25 | 0.19 |
| 12.50 | 0.07 |
| 25.00 | 0.004 |

It will be noted that when no alcohol is employed the treatment is particularly ineffective.

EXAMPLE III

A 30 per cent solution of liquid polybutadiene in n-heptane was prepared in a one-gallon stainless steel autoclave according to the method described in Example I. The dark-colored reaction product was divided into 100-milliliter portions which were extracted with 25 milliliters of solutions comprising 3 per cent sulfuric acid and various concentrations of sodium sulfate in mixtures of various proportions of water and methanol. The extraction process consisted of stirring the two phases for 30 minutes at room temperature with a laboratory stirrer run at 300 R. P. M. The mixture was then allowed to stand about 15 hours. In some cases, 10-milliliter samples of the oil phase were burned and ignited and the ash weighed to determine the extent to which sodium compounds were present. Results are presented in Table 2.

Table 2

| Sample No. | Composition of Treating Mixture, Parts by Weight | | | | Ash, Weight per cent (based on polymer) |
|---|---|---|---|---|---|
| | Water | Methanol | Sulfuric Acid | Sodium Sulfate | |
| 1 | 85 | 15 | 3 | 3 | 0.001 |
| 2 | 85 | 15 | 3 | 4 | 0.002 |
| 3 | 85 | 15 | 3 | 5 | |
| 4 | 85 | 15 | 3 | 6 | |
| 5 | 85 | 15 | 3 | 10 | |
| 6 | 85 | 15 | 3 | 15 | |
| 7 | 80 | 20 | 3 | 3 | 0.000 |
| 8 | 80 | 20 | 3 | 4 | |
| 9 | 80 | 20 | 3 | 5 | |
| 10 | 80 | 20 | 3 | 6 | |
| 11 | 80 | 20 | 3 | 10 | |
| 12 | 80 | 20 | 3 | 15 | |
| 13 | 75 | 25 | 3 | 3 | 0.002 |
| 14 | 75 | 25 | 3 | 4 | 0.001 |
| 15 | 75 | 25 | 3 | 5 | 0.002 |
| 16 | 75 | 25 | 3 | 6 | 0.001 |
| 17 | 75 | 25 | 3 | 10 | 0.000 |
| 18 | 75 | 25 | 3 | ¹15 | 0.000 |
| 19 | 65 | 25 | 3 | 4 | 0.000 |

¹ Sodium sulfate precipitated from the treating solution.

EXAMPLE IV

A polymerization was carried out as described in Example I. The reaction product was divided into five portions which were treated in the same manner as described in Example I except that the amount of sulfuric acid was varied as shown in Table 3.

Table 3

| Sulfuric Acid in Water Soln., Weight Per Cent | Ash, Weight Per Cent (based on polymer) |
|---|---|
| 1.0 | 0.005 |
| 2.5 | 0.000 |
| 3.0 | 0.000 |
| 5.0 | 0.002 |
| 8.0 | 0.000 |

EXAMPLE V

Successive one gallon portions of reaction mixtures, resulting from polymerizations carried out in the manner described in Example I, were treated with five gallons of a composition initially composed of 50 parts by volume of isopropanol and 100 parts by volume of a water solution containing five weight per cent sodium sulfate and one weight per cent sulfuric acid. In addition, to each one gallon portion of reaction mixture was added 10 volume per cent of isopropanol before treatment. The gallon portion to be treated, containing 10 weight per cent isopropanol, was placed in a glass column 3 inches in diameter and having a capacity of slightly more than one gallon, and the five gallons of treating solution was placed in a reservoir from which it was pumped through the polymer solution at the rate of 10 gallons of treating solution per hour for two hours. During the treatment of each gallon portion the pH of the treating solution was periodically checked with a pH meter. Enough sulfuric acid was added when necessary to hold the pH of the treating solution as close as possible to a value of 3.0. After 12 successive one gallon portions of the liquid polybutadiene solution had been treated in this manner the sodium sulfate content of the treating solution had reached a value of 7 weight per cent based on the water present. Part of the sodium sulfate was then removed from the treating solution before treating more one gallon batches of the polymer solution. The sodium sulfate content was thereafter held below 7 weight per cent of the water.

The treated polymer solutions were combined and the solvent and isopropanol stripped from the liquid polybutadiene. The polymer was clear and light in color and contained no detectable amount of ash.

It is to be understood that this invention should not be unnecessarily limited to the above discussion and description and that modifications and variations may be made without departing from the invention or from the scope of the claims.

Having described my invention, I claim:

1. In a process for the treatment of a liquid polybutadiene produced by solution polymerization of 1,3-butadiene in the presence of an alkali metal catalyst and in which a resulting polybutadiene solution is obtained which is contaminated with alkali metal, the improvement which comprises treating about 100 parts by volume of the resulting polybutadiene solution with a mixture comprising about 25 parts by volume of an alcohol containing not more than 4 carbon atoms per molecule and 25 parts by volume of a water solution containing a sufficient amount of a mineral acid to maintain the pH of said mixture in the range of from 6.5 to 0.1 and about five weight per cent of an alkali metal salt, thereby removing alkali metal from said polybutadiene.

2. A process for the treatment of a liquid polybutadiene produced by solution polymerization of a 1,3-butadiene in the presence of metallic sodium as a catalyst and which contains sodium as an impurity, which comprises treating about 100 parts by volume of the resulting liquid polybutadiene with a mixture comprising about 25 parts by volume of isopropanol and 25 parts by volume of a water solution containing about eight weight per cent of sulfuric acid and about five weight per cent of sodium sulfate, thereby removing sodium from said polybutadiene.

3. A method for treating a liquid polymer produced by polymerization of a conjugated diolefin in the presence of an alkali metal catalyst and which contains alkali metal as an impurity, which comprises treating said liquid polymer with a solution comprising water, a mineral acid and an alcohol containing not more than 4 carbon atoms per molecule, thereby removing alkali metal impurity from said polymer.

4. In a process for treating a liquid polymeric hydrocarbon material produced by polymerization of an monomeric hydrocarbon material containing a conjugated double bond system in the presence of an alkali metal catalyst and in which a resulting liquid polymeric hydrocarbon is obtained which contains an alkali metal contaminant, the improvement which comprises treating said liquid polymeric material with a solution comprising water, an alcohol containing not more than 4 carbon atoms per molecule, and a sufficient amount of an acid to maintain the pH of said solution below 6.5, thereby removing said contaminant from said polymeric material.

5. In a process for the treatment of a liquid co-polymer produced by solution polymerization of 1,3-butadiene and styrene in the presence of an alkali metal catalyst and in which a resulting co-polymer solution is obtained which contains alkali metal as an impurity, the improvement which comprises treating the resulting liquid co-polymer solution with a mixture comprising water, an alcohol containing not more than 4 carbon atoms per molecule and sufficient mineral acid to maintain the pH of said mixture in the range of 6.5 to 0.1, thereby removing said alkali metal impurity from said co-polymer.

6. In a process for the treatment of a liquid polybutadiene produced by solution polymerization of 1,3-butadiene in the presence of an alkali metal catalyst and in which a resulting polybutadiene solution is obtained which contains alkali metal as an impurity, the improvement which comprises treating said liquid polybutadiene with a mixture comprising water, an alcohol containing not more than 4 carbon atoms per molecule and a mineral acid, thereby removing said alkali metal impurity from said polybutadiene.

7. A process for treating a liquid co-polymer produced by the alkali metal catalyzed co-polymerization of a conjugated diolefin and an aromatic compound containing a vinyl group, said co-polymerization being conducted in the presence of a hydrocarbon solvent and the resulting solution containing an alkali metal impurity, which comprises treating 100 parts by volume of the resulting liquid co-polymer solution with from 10 to 500 parts by volume of a mixture comprising 30 to 90 per cent by volume of water, 70 to 10 per cent by volume of an alcohol containing not more than 4 carbon atoms per molecule and a sufficient amount of a mineral acid to maintain the pH of said mixture in the range of 6.5 to 0.1, thereby removing said alkali metal impurity from said co-polymer.

8. A process for removing sodium which is present as an impurity in a solution of polybutadiene in a normally liquid hydrocarbon, which comprises intimately mixing said solution with isopropanol, subsequently adding to said mixture an aqueous acidic solution having a pH between 6.5 and 0.1, and recovering a resulting purified polybutadiene solution so produced.

9. A process for removing an alkali metal which is present as an impurity in a liquid hydrocarbon, which comprises intimately mixing said liquid hydrocarbon with an alcohol having not more than four carbon atoms per molecule, subsequently adding to said mixture an aqueous solution having a pH below 6.5, and recovering a resulting purified liquid hydrocarbon so produced.

10. A process for removing alkali metal which is present as an impurity in a liquid hydrocarbon, which comprises admixing 100 parts by volume of said liquid hydrocarbon with from 10 to 500 parts by volume of a mixture comprising 30 to 90 per cent by volume of water, 70 to 10 per cent by volume of an alcohol containing not more than 4 carbon atoms per molecule and a sufficient amount of a mineral acid to maintain the pH of said mixture below 6.5, and recovering a resulting purified liquid hydrocarbon so produced.

11. The process of claim 10 wherein said mixture of water, alcohol, and mineral acid contains up to 15 weight per cent of an alkali metal salt.

12. The process of claim 10 wherein said pH is at least 3.

13. A process for removing metallic sodium which is present as an impurity in a liquid hydrocarbon, which comprises admixing 100 parts by volume of said liquid hydrocarbon with from 10 to 500 parts by volume of a mixture comprising 30 to 90 per cent by volume of water, 70 to 10 per cent by volume of an alcohol containing not more than 4 carbon atoms per molecule and a sufficient amount of a mineral acid to maintain the pH of said mixture below 6.5, and recovering a resulting purified liquid hydrocarbon so produced.

14. A process for removing metallic sodium which is present as an impurity in a solution of polybutadiene in a normally liquid hydrocarbon, which comprises admixing 100 parts by volume of said solution with from 10 to 500 parts by volume of a mixture comprising 30 to 90 per cent by volume of water, 70 to 10 per cent by volume of an alcohol containing not more than 4 carbon atoms in the molecule and a sufficient amount of a mineral acid to maintain the pH of said mixture within the limits of from 6.5 and 0.1, and recovering a resulting purified polybutadiene solution so produced.

WILLIE W. CROUCH.

REFERENCES CITED

The following references are of record in the file of this patent:

FOREIGN PATENTS

| Number | Country | Date |
|---|---|---|
| 545,193 | Great Britain | May 14, 1942 |